Figure 1:
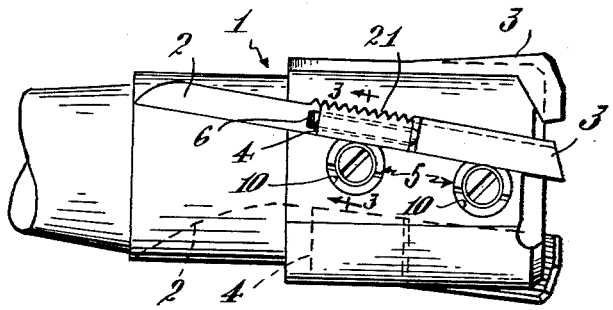

Dec. 25, 1962     T. V. WILLIAMS     3,069,937

CLAMP AND BIT HOLDER

Filed Nov. 29, 1960

INVENTOR.

Thurston V. Williams

BY

Roberts, Cushman & Grover

ATT'YS

United States Patent Office 3,069,937
Patented Dec. 25, 1962

3,069,937
CLAMP AND BIT HOLDER
Thurston V. Williams, Wilton, N.H., assignor to The O. K. Tool Company, Inc., Milford, N.H., a corporation of New Hampshire
Filed Nov. 29, 1960, Ser. No. 72,487
9 Claims. (Cl. 77—75)

This invention relates to an expansible clamp and particularly to an improved bit holder.

Objects of the invention are to provide a clamp which is simple and economical in construction, which can be adjusted easily and quickly and which will clamp an article or device securely.

Other objects are to provide a bit holder which can be manufactured economically, which can be assembled and adjusted with facility, which holds a bit securely in adjusted position, and which is generally superior to prior holders.

In one aspect the present invention involves a clamp comprising a cylindrical body member having a flaring recess in one end and being split lengthwise from that end toward the other end, together with a tapered plug member fitting into the recess and a screw extending through one member and threading into the other member for drawing the two members together, thereby to expand the body member. The body member preferably has a flat face for engagement with a bit or other article and the aforesaid split is approximately parallel to the flat face. In the preferred embodiment the body member has a flaring recess at each end and a slit extending lengthwise from each end toward the other end, together with a screw having a tapered head seating in one of the recesses and threading into the plug member. Preferably the slits are offset from each other transversely of the aforesaid face and overlap each other lengthwise of the face.

In another aspect the invention involves a cutting tool comprising a bit, a holder having a recess to receive the bit and a cylindrical bore at one side of the recess, the bore extending approximately parallel to the adjacent wall of the recess and having an opening into the recess along one side, together with a circular body member fitting the recess with a flat face presented to the aforesaid opening, the body member having a flaring recess in one end, a tapered plug member fitting into the tapered recess and a screw extending through one of the members and threading into the other member for drawing the members together and thereby expanding the body member through the aforesaid opening into the bit recess.

In a more specific aspect the invention involves a cutting tool comprising a circular holder having in its periphery a groove which extends to the front end of the holder, in combination with a bit disposed in the groove and projecting forwardly from the holder, a backer disposed in the groove behind the bit, a screw extending through the backer lengthwise of the groove with its forward end bearing on the rear end of the bit, the holder having a circular recess at one side of the groove opposite the bit and another circular recess at one side of the groove opposite the backer, the axis of each recess extending approximately radially of the holder and each recess having an opening into the groove, wedges in the recesses for clamping the bit and backer in adjusted position, the wedges comprising circular body portions fitting the recesses with flat faces presented at the aforesaid openings, the body portions being expansible, and screws extending axially of the wedges for expanding the body portion.

Figure 2:
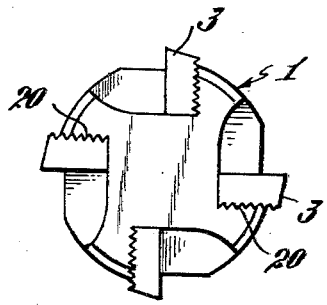
Figure 3:
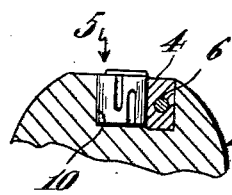
Figure 4:
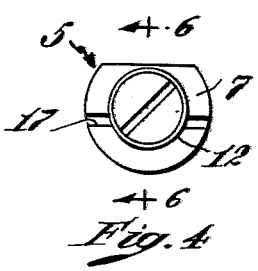
Figure 5:
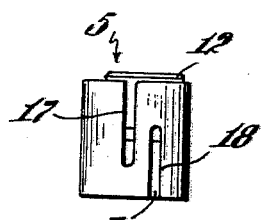
Figure 8:
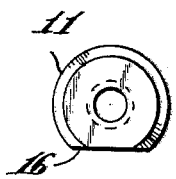
Figure 7:
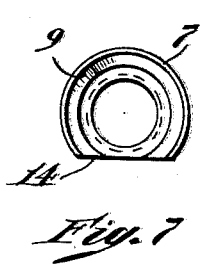
Figure 6:
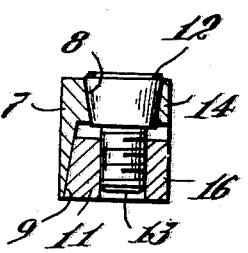

For the purpose of illustration typical embodiments of the invention are shown in the accompanying drawings in which:

FIG. 1 is a side view of a reamer;
FIG. 2 is an end view of the reamer;
FIG. 3 is a section on line 3—3 of FIG. 1;
FIG. 4 is an end view of one of the clamps;
FIG. 5 is a side view of the clamp;
FIG. 6 is a section on line 6—6 of FIG. 4;
FIG. 7 is a bottom view of the body member of the clamp; and
FIG. 8 is a top view of the plug member of the clamp.

The particular embodiment of the invention shown in FIGS. 1 to 8 comprises a cylindrical bit holder 1 having grooves 2 in its periphery for mounting bits 3. Disposed in the grooves behind the bits are backers 4. Threaded lengthwise through each backer is a screw 6 which abuts the rear end of the associated bit. Adjacent each bit and each backer is a radial bore 10 containing a clamp 5 for holding the bit or backer in adjusted position, each radial bore opening into the associated groove 2.

Each clamp 5 comprises a cylindrical body member 7 fitting into the radial bore. The outer end of the body member has a conical recess 8 and the inner end has a conical recess 9. Fitting into the inner recess 9 is a conical plug member 11 and fitting into the outer recess is the conical head 12 of a screw 13 which threads into the plug member. The body member 7 has a flat face 14 presented to the aforesaid opening into the groove and the plug member 11 has a flat face 16 disposed substantially in the same plane. The body member has a slit 17 extending inwardly from its outer end and a slit 18 extending outwardly from the inner end, the two slits being offset and overlapping as shown in FIGS. 3 and 5.

To assemble the parts the bits and backers are slipped into the slots 2 with the bits projecting from the front end of the holder somewhat less than desired. With the screws 13 retracted to the point where the plugs 11 are merely held within the body 7 without expanding the body, the clamps are slipped into the radial bores. Then the backers 4 are clamped in position by advancing the screws 13 of the backer clamps, thereby to expand the body member 7 through the openings in the grooves 2 against the backers. With the backers thus clamped in fixed position the screws 6 are advanced to push the bit 3 forwardly until each bit projects from the face of the holder 1 the desired amount. Then the bits are clamped in position by advancing screws 13 of the bit clamps.

In order to provide a secure grip by the body member 7 on each of the bits 3 and the backers 4 there are preferably provided two sets of serrations for each groove 2, each set being effective to prevent movement in one direction. The serrations 20 between the bit 3 and the body 7 prevent any radial movement of the bit from its proper cutting position while the serrations 21 between the backer 4 and the body 7 prevent the cutting force, transmitted by the bit 3 and the screw 6, from axially shifting the bit within the slot 2.

From the foregoing it will be evident that all of the parts may be manufactured economically and may be assembled and adjusted with facility.

It should be understood that the present disclosure is for the purpose of illustration only and that this invention includes all modifications and equivalents which fall within the scope of the appended claims.

I claim:

1. A bit clamp comprising a circular body member having a flat bit-clamping face on one side and having a flaring recess in one end and being split from that end toward the other end approximately parallel to said face to increase the expansibility of the member, a tapered plug member fitting into said flaring recess, and a screw extending through one of said members and threading into the other member for drawing the members together and thereby expanding the body member transversely of said bit-clamping face.

2. A bit clamp comprising a circular body member having a flat bit-clamping face on one side and having a flaring recess in one end and being split from that end toward the other end approximately parallel to said face to increase the expansibility of the member, a tapered plug member fitting into said flaring recess and having a flat bit-clamping face substantially in the same plane as said face, and a screw extending through one of said members and threading into the other member for drawing the members together and thereby expanding the body member transversely of said bit-clamping face.

3. A bit clamp comprising a circular body member having a flat bit-clamping face on one side and having a flaring recess in each end and having a split from each end toward the other end to increase the expansibility of the member, said splits being offset from each other transversely of said face and overlapping lengthwise of the face, a tapered plug member fitted into one of said flaring recesses, and a screw having a tapered head seating in the other recess and threading into the plug member for drawing the members together and thereby expanding the body member transversely of said face.

4. A bit clamp comprising a circular body member having a flat bit-clamping face on one side and having a flaring recess in each end and having a split from each end toward the other end to increase the expansibility of the member, said splits being offset from each other transversely of said face and overlapping lengthwise of the face, a tapered plug member fitted into one of said flaring recesses and having a flat bit-clamping face substantially in the same plane as said face, and a screw having a tapered head seating in the other recess and threading into the plug member for drawing the members together and thereby expanding the body member transversely of said face.

5. A cutting tool comprising a bit, a holder having a recess to receive the bit and a cylindrical bore at one side of the recess, the bore extending approximately parallel to the adjacent wall of the recess and having an opening into the recess along one side, a circular body member fitting the recess with a flat face presented to said opening, the body member having a flaring recess in one end, a tapered plug member fitted into said flaring recess, and a screw extending through one of said members and threading into the other member for drawing the members together and thereby expanding the body member through said opening into the bit recess.

6. A cutting tool comprising a bit, a holder having a recess to receive the bit and a cylindrical bore at one side of the recess, the bore extending approximately parallel to the adjacent wall of the recess and having an opening into the recess along one side, a circular body member fitting the recess with a flat face presented to said opening, the body member having a flaring recess in one end and having a split substantially parallel to said face from that end toward the other end to increase the expansibility of the member, a tapered plug member fitting into said flaring recess, and a screw extending through one of said members and threading into the other member for drawing the members together and thereby expanding the body member through said opening into the bit recess.

7. A cutting tool comprising a bit, a holder having a recess to receive the bit and a cylindrical bore at one side of the recess, the bore extending approximately parallel to the adjacent wall of the recess and having an opening into the recess along one side, a circular body member fitting the bore with a flat face presented to said opening, the body member having a flaring recess in each end and having a split substantially parallel to said face from one end toward the other end to increase the expansibility of the member, a tapered plug member fitting into one of said flaring recesses, and a screw having a tapered head seating in the other of said recesses and threading into the plug member for drawing the members together and thereby expanding the body member through said opening into the bit recess.

8. A cutting tool comprising a bit, a holder having a recess to receive the bit and a cylindrical bore at one side of the recess, the bore extending approximately parallel to the adjacent wall of the recess and having an opening into the recess along one side, a circular body member fitting the recess with a flat face presented to said opening, the body member having a flaring recess in each end and having a split substantially parallel to said face from one end toward the other end to increase the expansibility of the member, said splits being offset from each other transversely of said face and overlapping lengthwise of the face, a tapered plug member fitting into one of said flaring recesses, and a screw having a tapered head seating in one of said recesses and threading into the plug member for drawing the member together and thereby expanding the body member through said opening into the bit recess.

9. A cutting tool comprising a circular holder having in its periphery a groove which extends to the front end of the holder, a bit disposed in the groove and projecting forwardly from the holder, a backer disposed in the groove behind the bit, a screw extending through the backer lengthwise of the groove with its forward end bearing on the rear end of the bit, said holder having a circular recess at one side of the groove opposite the bit and another circular recess ot one side of the groove opposite the backer, the axis of each recess extending approximately radially of the holder and each recess having an opening into the groove, and wedges in said recesses for clamping the bit and backer in adjusted position, the wedges comprising circular body members fitting the recesses with flat faces presented at said openings, each body member having a flaring recess in each end and having a split substantially parallel to said face from each end toward the other end, said splits being offset from each other transversely of said face and overlapping lengthwise of the face, a tapered plug member fitting into one of said flaring recesses, and a screw having a tapered head seating in one of said recesses and threading into the plug member.

References Cited in the file of this patent

UNITED STATES PATENTS

| 2,485,324 | Sheldrick | Oct. 18, 1949 |
| 2,547,789 | Skeel | Apr. 3, 1951 |

FOREIGN PATENTS

| 738,712 | Great Britain | Oct. 19, 1953 |